United States Patent [19]

Ripley et al.

[11] Patent Number: 4,844,657

[45] Date of Patent: Jul. 4, 1989

[54] PIPE SUPPORTING DAM ASSEMBLY FOR PIPELINE CONSTRUCTION AND METHOD

[76] Inventors: James A. Ripley, R.R.#2, Box 624, Chichester, N.H. 03263; Robert E. McDonough, 16 Meserve Rd., Durham, N.H. 03824

[21] Appl. No.: 251,917

[22] Filed: Sep. 30, 1988

[51] Int. Cl.$^4$ ............................................. F16L 1/02
[52] U.S. Cl. .................................. 405/154; 405/157; 138/105; 248/49
[58] Field of Search ................ 405/154, 157, 115, 37, 405/38, 39, 74, 125, 126; 138/105, 106; 248/49, 56

[56] References Cited

U.S. PATENT DOCUMENTS

| | | | |
|---|---|---|---|
| 337,819 | 3/1886 | Dill | 405/125 |
| 826,414 | 7/1906 | Feltz | 405/126 X |
| 961,908 | 6/1910 | Storms | 405/125 |
| 4,063,429 | 12/1977 | Wilson | 405/157 |

Primary Examiner—Dennis L. Taylor
Assistant Examiner—J. Russell McBee
Attorney, Agent, or Firm—Rines and Rines

[57] ABSTRACT

A pipe supporting dam assembly and method for pipeline construction employing a planar dam sheet with a collar and a flexible sleeve for receiving and supporting the pipe, and clamping means to seal the collar to the outside of the pipe to prevent fill material in the trench being washed away by groundwater along the outside surface of the pipe, particularly in the case of sloping pipeline construction.

8 Claims, 2 Drawing Sheets

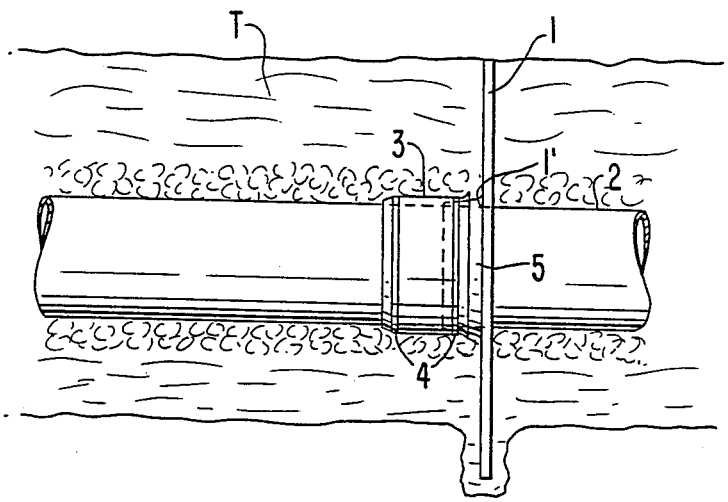
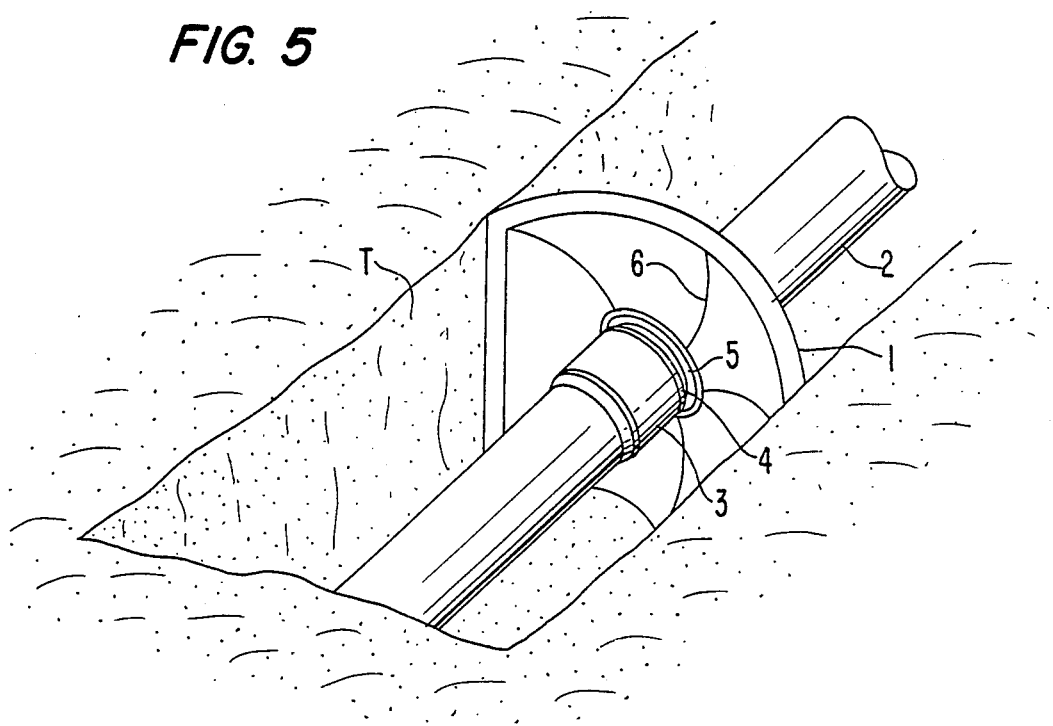

4,844,657

PIPE SUPPORTING DAM ASSEMBLY FOR PIPELINE CONSTRUCTION AND METHOD

BACKGROUND OF THE INVENTION

The present invention relates to pipe supporting dam assemblies and methods for pipeline constructions, being particularly useful for preventing the flow of groundwater from following the path along the outside of the sloping pipe and washing away bedding of backfill material in the pipeline trench which can cause structural collapse or the consequent build-up of fines of the backfill that can cause heaving of the upper pavement surface, or silt pollution at the point of pipe-to-surface penetration.

In such pipeline construction for sewer and drainage systems and the like, PVC or other pipe conduits are installed in the earth in a trench and covered with stone bedding and then the backfill material to give a solid and compact base to the pipe installation. In order to have bedding material that will compact, material that has a very low plasticity (which allows water to transmit through it freely) has to be used. For example, bedding material used for PVC pipe is generally washed stone which has high compactibility and it also has voids that allow water to move through it freely. Especially in a soil fill that has a high plasticity content or index, groundwater seeks the easiest route through the stone, seeking its own level, and will follow the slope of the pipe along the outside surface thereof. When this happens, the bedding and other material on top of the pipe, which normally contains fines, generally sand, is subject to water picking up these fines in the bedding or other material packed around the pipe and carrying them along either the bottom of the trench or along the outside surface of the pipe, frequently developing a build-up that can cause a structural fill collapse in the road.

Prior to the present invention, there have been two principal technologies for trying to mitigate against such water flow effects. One has been to pour concrete around the pipe, but this creates an undue stress on the pipe, especially with ground movement; and, in addition, the concrete does not seal to the PVC pipe so the water can still flow along the outside surface of the pipe. Another technique has been to create an earth or a clay dam, where the clay is actually imported to the site and packed around the pipe; but this also leaves much to be desired since its effectiveness depends upon correct installation and because clay has a high plasticity index which results in the development of voids, with the clay, moreover, not actually sealing to the pipe but allowing the groundwater to flow along the outside of the pipe.

BRIEF SUMMARY OF THE INVENTION

An object of the present invention, therefore, is to provide a new and improved pipe supporting dam assembly and method that are not subject to such disadvantages and that, to the contrary, support the pipe along the trench, effectively preventing groundwater from traveling therealong and thus obviating the possibility of road collapse.

Another object is to provide a novel pipe supporting dam assembly for pipeline construction that is easy to install and has both long-lasting water sealing and dam features.

Other and further objects will be explained hereinafter and are more particularly pointed out in the appended claims.

In summary, however, from one of its broader viewpoints, the invention embraces a pipe supporting dam assembly for earth trench pipeline construction to prevent fines in bedding and other material filled into the trench from being carried away by groundwater along the outside surface of the buried pipe, the assembly having, in combination, a planar dam sheet having a circular opening from which a collar extends for receiving the pipe, and a flexible connector sleeve disposed over the collar and the adjacent portion of the pipe received therethrough to connect the same and support the pipe, and clamping means for sealing the sleeve to the collar and the pipe to stop the flow of groundwater and fines carried thereby at the dam sheet and to prevent passage along the outside surface of the pipe. Preferred and best mode embodiment and details are hereinafter presented.

BRIEF DESCRIPTION OF THE DRAWINGS

The invention will now be described with reference to the accompanying drawings, FIG. 1 of which is an isometric view of the pipe and dam sheet assembled and connected with a flexible sleeve connector;

FIG. 4 is a schematic drawing of the dam sheet and pipe assembled together with a connector and laid in the trench; and FIG. 5 is an isometric view of the dam sheet installation.

DETAILED DESCRIPTION OF THE INVENTION

Figure 1:
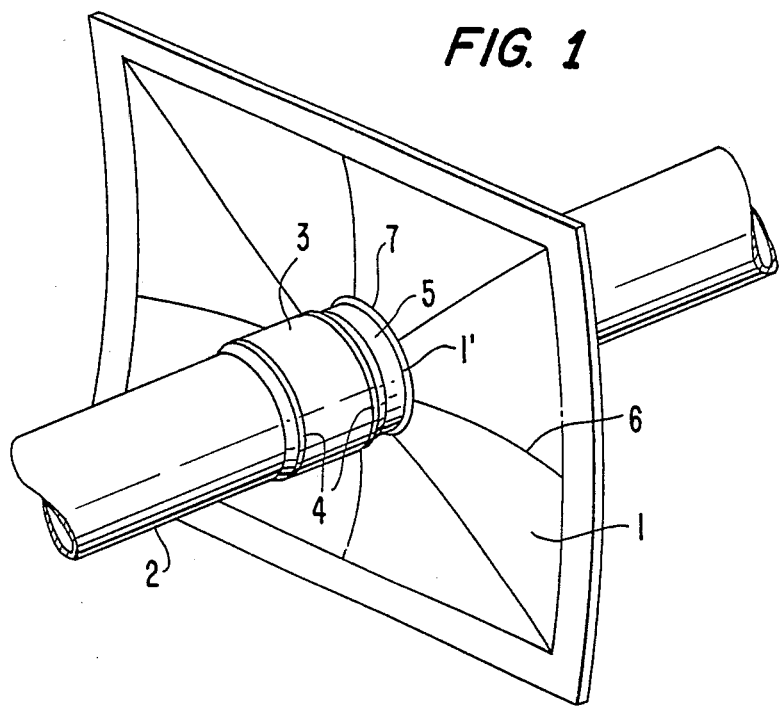

Refering to FIG. 1 of the drawing, a section of pipe 2, such as a PVC or other sewer or drainage pipe or the like, is shown assembled with a planar dam sheet 1 formed with a central or other interior preferably circular aperture or opening 1' from which a reentrant collar 5 extends, shown rearwardly or to the left in FIG. 1. In accordance with the invention the dam sheet 1 is to be filled transversely across a trench T, FIGS. 4 and 5, with the side edges contacting and preferably embedded within the side walls of the trench, and the bottom edge inserted in the bottom of the trench. By fabricating the dam sheet 1 of relatively flexible or resilient non-rotting, corrosion-resistant and light-weight plastic material, such as ABS (acrylonitrile- butadiene- styrene or the like), it may be transversely flexed and snap-fitted into the trench side walls as shown in FIG. 5. Except for the aperture or opening 1', the dam sheet will be impervious to groundwater flow along the interior of the trench T.

The pipe 2 is shown received through the opening 1' and collar 5 and is supported by a resilient sleeve connector 3, as of rubber, that is fitted at one end (right, in FIG. 1.) over the collar 5 and at its extension or other end (left, in FIG. 1) fits over the adjacent portion of the pipe 2 received through the collar 5. The resilient nature of the sleeve 3, with, if required, a tapered cross-section depending upon the relative diameters of the inner surface of the collar 5 and the smaller outer diameter of the pipe 2, enables a tight fit which, when clamped, as by metal band strips 4 tightened over the sleeve 3 at the regions of its overlap of the collar 5 and the pipe 2, FIG. 1, effects an excellent support suspension of the pipe( horizontally through the dam sheet or at an incline or slope, as desired) and seals against groundwater with accompanying fill fines and the like passing along the outer surface of the pipe across the dam sheet 1.

While, as before stated, it is desirable that the dam sheet 1 be light weight and flexible for the purposes of the above-desired trench installation, structural reinforcement can be provided without sacrificing lateral flexibility by forming diagonal ribs 6, and to strengthen the intergral collar 5 and accommodate for torque forces resulting from the pipe suspension, one or more coaxial circular ribs 7, FIG. 1, may similarly be provided, also deformed out of the plane of the dam sheet 1.

Figure 2:
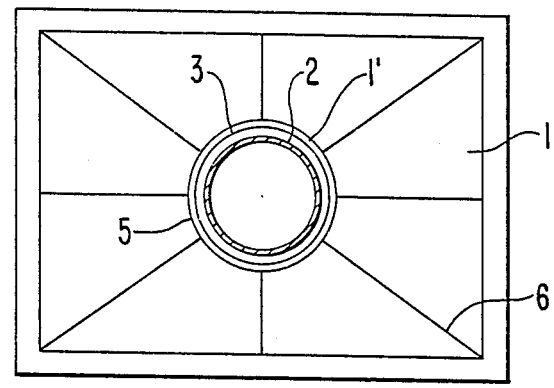
FIG. 2 is a front view of the pipe and dam sheet so assembled.
Figure 3:
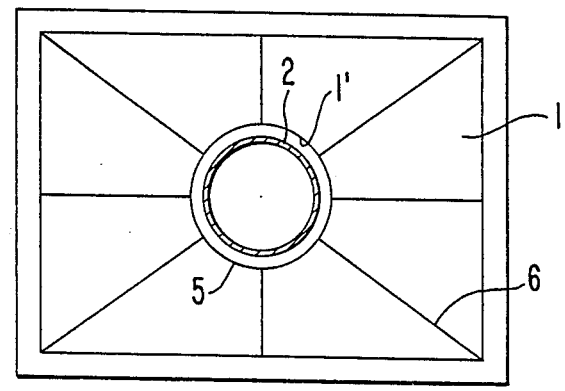
FIG. 3 is the rear view of FIG. 2.

An important point of assembling the pipe 2 with the dam sheet is that the collar 5 does not touch the pipe, as is shown in FIGS. 2,3 and 4. The diameter of the collar, as before stated, is larger than that of the pipe. It is the flexible connector 3 that aligns or supports the pipe in position through, but not touching, the walls of the collar 5 or aperture 1'. This suspension, moreover, eliminates any material stress on the pipe 2, as well. The rubber or other resilient sleeve connector 3 has enough resilience to absorb shock and produce a cushioning effect between the pipe and the dam sheet, while it effects the previously desired seal across the dam sheet.

Further modifications of the invention herein described will occur to those skilled in this art and all such modifications are deemed to be within the spirit and scope of the invention as defined in the appended claims.

What is claimed is:

1. A pipe supporting dam assembly for earth trench pipeline construction to prevent fines in the bedding and other materials filled into the trench from being carried away by groundwater along the outside surface of the buried pipe, the assembly having, in combination, a planar dam sheet having a circular opening from which a collar extends for receiving the pipe, a flexible sleeve disposed over the collar and the adjacent portion of the pipe received therethrough to connect the same and support the pipe, and a clamping means for sealing the sleeve to the collar and the pipe to stop the flow of groundwater and fines carried thereby at the dam sheet and to prevent passage along the outside surface of the pipe.

2. A pipe supporting dam assembly as claimed in claim 1 in which said dam sheet is flexible to facilitate bending in installation against the walls of the trench.

3. A pipe supporting dam assembly as claimed in claim 1 in which said dam sheet is formed of plastic such as acrylonitrile-butadiene-styrene and the sleeve is of resilient material such as rubber.

4. A pipe supporting dam assembly as claimed in claim 1 in which diagonal ribs are provided in the dam sheet to provide structural strength while permitting lateral flexibility.

5. A pipe supporting dam assembly as claimed in claim 1 in which the inner diameter of said collar is sufficiently larger than the outside diameter of the pipe supported therethrough so that the collar does not touch the sleeve-supported pipe.

6. A pipe supporting dam assembly as claimed in claim 1 in which circular ribs are provided on the collar of the planar dam sheet to reinforce the collar against torque forces.

7. A method of preventing the flow of groundwater and accompanying fines in the backfill packed about an earth-trench buried pipeline along the outer surface of the pipe, that comprises, prior to filling the trench,
   a. inserting a flexible planar dam sheet having a collared aperture across the trench with the sides and bottom edge thereof contacting the side walls and bottom of the trench, respectively;
   b. fitting a water-tight flexible sleeve over the collar and extending therebeyond and;
   c. passing the pipe through the collared aperture and sleeve from one side of the dam sheet to the other; and,
   d. clamping the sleeve to the collar and to the adjacent portion of the pipe to enable the sleeve to support the pipe within the dam sheet aperture and collar and with a water-tight seal that prevents the flow of groundwater along the pipe from one side to the other side of the dam sheet.

8. A method as claimed in claim 7 in which the dam sheet is laterally flexed and snap fitted into the trench side walls.

* * * * *